United States Patent [19]

Aaltonen et al.

[11] Patent Number: 4,873,111
[45] Date of Patent: Oct. 10, 1989

[54] FUR ANIMAL FEED AND A METHOD FOR PREPARING THE SAME

[75] Inventors: Pirkko K. Aaltonen; Ilkka T. Siissalo, both of, Helsinki, Finland

[73] Assignee: Cultor Oy, Helsinki, Finland

[21] Appl. No.: 146,832

[22] Filed: Jan. 22, 1988

[30] Foreign Application Priority Data

Jan. 23, 1987 [FI] Finland .................................. 870287

[51] Int. Cl.$^4$ .............................................. A23K 1/10
[52] U.S. Cl. .................... 426/623; 426/630; 426/634; 426/635; 426/641; 426/646; 426/658; 426/807
[58] Field of Search ............... 426/646, 635, 576, 577, 426/641, 623, 807, 630, 634, 658

[56] References Cited

U.S. PATENT DOCUMENTS

| | | | |
|---|---|---|---|
| 3,408,201 | 10/1968 | Moyle | 426/641 |
| 3,982,003 | 9/1976 | Mitchell et al. | 426/1 |
| 4,143,169 | 3/1979 | Skoch et al. | 426/601 |
| 4,451,489 | 5/1984 | Beale et al. | 426/269 X |

FOREIGN PATENT DOCUMENTS

| | | |
|---|---|---|
| 47257 | 7/1965 | Finland . |
| 36428 | 8/1967 | Finland . |
| 37246 | 1/1969 | Finland . |

OTHER PUBLICATIONS

Hawley "The Condensed Chemical Dictionary" Van Nostrand Reinhold Co. Tenth Edition (1982) pp. 199–200, 521 & 780.

*Primary Examiner*—R. B. Penland
*Attorney, Agent, or Firm*—Merchant, Gould, Smith, Edell, Welter & Schmidt

[57] ABSTRACT

A method for thickening and/or toughening fur animal feed, wherein the feed is supplied with a nutritionally useful, natural hydrocolloid, which binds the free water present in the feed, and a fur animal feed containing an amount of the said hydrocolloid.

4 Claims, No Drawings

FUR ANIMAL FEED AND A METHOD FOR PREPARING THE SAME

The present invention relates to a method for thickening and/or toughening fur animal feed, particularly mink feed. Moreover, the invention relates to such fur animal feed, particularly mink feed, which is thickened and/or toughened according to the said method.

Fur animal feed, particularly mink feed, is normally prepared in a feed preparation centre, wherefrom it is distributed to the farms. The time between preparation and consumption may be anything up to 24 hours. The feed is supplied, by means of a pump or manually, onto the netting of the cage, the mesh of a mink cage for instance being 2,5×2,5 cm. If the water-binding capacity of the feed is not sufficient, if it is not thick and tough enough, it will muck up the fur or drop down through the floor netting and be wasted. In that case the mink does not get enough food, which results in poor growth, poor breeding and poor quality of the skin. In order to ensure sufficient nutrition for the mink, the feed portions must be superfluous, which adds to the expenses. Thus the texture of mink feed is of great economical importance in mink farming.

In practice, solving of the problem has been tried by increasing the dry matter content of mink feed over the nutritional need, which leads to an uneconomical overconsumption of the feed. Another attempt to solve the problem has been to supply the feed with agents which improve its thickness and toughness and bind water, such agents being for instance sodium alginate, guarkum and algal powder. Many water-binding agents, however, increase the water content of the excrement, i.e. cause diarrhea, weaken the digestibility of the feed and lead to remarkable extra expenses.

The object of the present invention is to eliminate the above mentioned drawbacks. A particular object of the invention is to introduce a method for thickening and/or toughening fur animal feed.

Yet another object of the invention is to introduce a thickened and/or toughened fur animal feed of a new type, where the agent causing the thickening and/or toughening also has nutritional value.

As regards the characteristic novel features of the invention, the appended patent claims are referred to.

In the method of the present invention, natural hydrocolloid is added to conventional fur animal feed in order to improve the feed texture. The hydrocolloid binds the free water present in the feed and thus makes the feed thick and/or tough. Moreover, in the digestive system of the animal, the hydrocolloid is broken up to nutrients, and thus it improves the nutritional value of the feed.

Among the hydrocolloids to be added to the feed are for example substances or mixtures containing for instance pectine and hemicellulose in a suitable ratio. A particularly well suited hydrocolloid is a hydrothermally treated mixture of sugar beet slices.

Toughening agents can, if necessary, be added to fur animal feed containing hydrocolloid, such agents being for instance carboxy-methyl cellulose, xanthan gum, chemically modified starch and/or polyacrylic amides. It has been proved that these agents do not cause intestinal trouble to minks.

The texture of the fur animal feed prepared according to the method of the present invention is thick and/or tough. The feed portions remain on top of the cage without dripping or dropping, and a nutritionally satisfactory amount suffices for one portion.

The fur animal feed of the invention contains fur animal feed known as such, plus nutritionally valuable, natural hydrocolloid, which binds the free water present in the feed, thus making the fur animal feed thick and/or tough. In the animal's organism the hydrocolloid is broken up into nutrients without irritating the digestive system, so that indigestion, for instance diarrhea, is avoided.

Among the natural hydrocolloids let us mention the pectine-containing substances that exist in the skins and peels of berries and fruit, as well as the pectine-hemicellulose mixtures present in root crops.

The hydrothermal treatment of the beet slices can be carried out by means of non-pressurized boiling, boiling in an autoclave or advantageously by means of extrusion. The extrusion is performed in conventional fashion by employing an extrusion device, where the temperature is maintained as low as possible, for example within the region 100°–300°, suitably in about 170°–200°; the recommended content of extruded beet slices for instance in mink feed is about 1–6% of the feed.

The crude protein content of hydrothermally treated beet slices is 11–17% of the dry matter content. The slices bind water 5–10 times their own weight, and the bound water remains in the slices for at least 24 hours. The adding of hydrothermally treated slices to the mink feed improves the thickness of the feed by binding the free water present in the feed.

In a preferred application, the fur animal feed contains toughening agents. Among the additives to be used in the feed, let us mention for instance xanthan gum 0–5%, suitably 0–0.5%; carboxy-methyl cellulose 0–5%, suitably 0–0.5%; chemically modified starch 0–5%; polyacrylic amides 0–1%, suitably 0–0.1%. The polyacrylic amides must be acceptable as food ingredients. The polyacrylic amides can be anionic, neutral or cationic, and their molecular weight can be for instance $12 \times 10 E\ 6 - 18 \times 10 E\ 6$.

The composition, texture and dry matter content of the fresh feed, as well as the desired solidity and toughness of the mink feed, determine the type and quantity of the texture-improving agents of the above type that should be used in each case.

The fur animal feed which comprising hydrothermally treated sugar beet slices and/or some natural, pectine-containing hydrocolloid, can also contain one or several toughness-increasing agents.

The advantage of the present invention, in comparison with the prior art, is the economy in farming which is due to the texture and composition of the fur animal feed according to the invention. The thick, tough feed remains on top of the cage, and the agents which bring about the thickness and toughness in the feed do not cause indigestion. Thus superfluous feed portions are avoided, as well as additional costs caused by possible health problems of the mink. Moreover, the hydrocolloid contained in the feed adds to the nutritional value thereof.

In the following the invention is further illustrated by means of practical examples.

EXAMPLE 1

Composition of hydrothermally treated sugar beet slices:

|  | % of dry matter |
| --- | --- |
| Hexoses |  |
| Glucose | 18–22 |
| Galactose | 5–6 |
| Mannose | 1.0 |
| Rhamnose | 2.5 |
| Pentoses |  |
| Xylose | 1.7 |
| Arabinose | 18–22 |
| Uronic acids | 22–26 |

Determination of the water-binding capacity of hydrothermally treated sugar beet slices: 5 g of the slices (dry matter) was mixed to 50 ml room-temperature water, and the mixture was allowed to swell for 30 min. After swelling, the mixture was centrifuged for 10 min at 3000 rpm, and the surplus water was carefully removed by decantation. The remaining beet mixture which contained bound water was weighed, and the water-binding capacity was calculated by means of dividing by the original amount of dry slices, so that the so-called water-binding coefficient was obtained.

The procedure was repeated after 24 hours, and the water-retention capacity was obtained.

The water-binding results obtained in practical experiments have been 6–10 times the weight of the original slices. After 24 hours, the water-retention capacity has remained the same, i.e. the water bound in the beet slices has not separated within 24 hours.

EXAMPLE 2

An experimental feed of hydrothermally treated beet slices and a reference feed which did not contain beet slices were subjected to the following experiment of texture comparison:

|  | Reference feed | Experiment feed |
| --- | --- | --- |
| Fresh feed | 50% | 46% |
| (fresh fish, acid-conserved fish, fresh offal, acid-conserved offal, blood) |  |  |
| Dry feed concentrate | 25% | 20% |
| (fish meal, grain, soy flour) |  |  |
| Extruded slices | — | 3% |
| Water | 25% | 31% |

The texture of the reference feed was softened in 24 hours (+5° C.), and water was separated on the feed surface. The experiment feed maintained its solidity in similar conditions.

Examples 3–6 illustrate the compositions of a few suggestions for mink feed according to the present invention.

EXAMPLE 3, MINK FEED

| Fresh feed, dry matter 24% | 46% |
| --- | --- |
| Dry feed concentrate | 20% |
| Extruded beet slices | 2.8% |
| Carboxy-methyl cellulose | 0.2% |
| Water | 31% |

The dry matter content of the prepared feed was 31.8%. It had excellent solidity and toughness.

EXAMPLE 4, MINK FEED

| Fresh feed, dry matter 33% | 48.8% |
| --- | --- |
| Dry feed concentrate | 21.3% |
| Extruded beet slices | 2.0% |
| Carboxy-methyl cellulose | 0.18% |
| Xanthan gum | 0.02% |
| Chemically modified starch | 0.24% |
| Water | 27.46% |

The dry matter content of the feed was 35.7%, solidity and toughness excellent.

EXAMPLE 5, MINK FEED

| Fresh feed, dry matter 24% | 45.0% |
| --- | --- |
| Dry feed concentrate | 23.0% |
| Extruded beet slices | 3.0% |
| Polyacrylic amide (cationic) | 0.01% |
| water | 29.0% |

Dry matter content of the feed was 34%, thickness and toughness excellent.

EXAMPLE 6, MINK FEED

| Fresh feed, dry matter 24% | 45.0% |
| --- | --- |
| Dry feed concentrate | 21.0% |
| Extruded beet slices | 2.0% |
| Carboxy-methyl cellulose | 0.1% |
| Polyacrylic amide (anionic) | 0.05% |
| Polyacrylic amide (cationic) | 0.05% |
| Water | 31.9% |

Dry matter content of the feed was 31.5%, thickness and toughness excellent.

We claim:

1. A method for thickening and toughening fur animal feed, particularly mink feed, comprising the steps of (i) obtaining a raw material selected from the group consisting of fresh fish, conserved fish, fresh offal, conserved offal, fish meal, grain and soy flour; and (ii) adding hydrothermally treated sugar beet slices to the raw material in an amount of about 1–6 % by weight of the total weight of the feed, for binding the free water present in the feed and for providing added nutritional value.

2. The method of claim 1 wherein the sugar beet slices are added to the feed are extruded slices.

3. The method of claim 1 wherein pectin or hemicellulose is added to the feed.

4. The method of claim 1 wherein at least one additive selected from the group consisting of up to 5 wt % xanthan gum, up to 5 wt % carboxy-methyl cellulose, up to 5 wt % chemically modified starch, and up to 1 wt % polyacrylic amides is added to the feed.

* * * * *

UNITED STATES PATENT AND TRADEMARK OFFICE
CERTIFICATE OF CORRECTION

PATENT NO.   :   4,873,111

DATED        :   October 10, 1989

INVENTOR(S)  :   Aaltonen et al.

It is certified that error appears in the above-identified patent and that said Letters Patent is hereby corrected as shown below:

Column 2, line 47, "comprising" should be --comprises--;

Column 3, line 47, "flour" should be --flour)--;

Column 4, line 56, delete first "are".

Signed and Sealed this

Nineteenth Day of May, 1992

Attest:

DOUGLAS B. COMER

*Attesting Officer*   *Acting Commissioner of Patents and Trademarks*